United States Patent [19]

Iizuka

[11] Patent Number: 5,343,990
[45] Date of Patent: Sep. 6, 1994

[54] CONTROL SYSTEM FOR LOCK-UP TORQUE CONVERTER FOR AUTOMATIC TRANSMISSIONS

[75] Inventor: Naonori Iizuka, Fuji, Japan
[73] Assignee: Jatco Corporation, Fuji, Japan
[21] Appl. No.: 8,142
[22] Filed: Jan. 25, 1993

[30] Foreign Application Priority Data

Jan. 28, 1992 [JP] Japan ................................. 4-037130

[51] Int. Cl.⁵ ....................... F16D 33/00; B60K 41/02
[52] U.S. Cl. ................................. 192/3.31; 192/3.29; 192/3.33; 192/103 F
[58] Field of Search .................... 192/3.31, 3.29, 3.33, 192/103 F

[56] References Cited

U.S. PATENT DOCUMENTS

| | | | |
|---|---|---|---|
| 4,640,394 | 2/1987 | Higashi et al. | 192/3.31 X |
| 4,664,235 | 5/1987 | Yokoyama et al. | 192/3.31 X |
| 4,676,353 | 6/1987 | Matsuda | 192/3.29 X |
| 4,803,901 | 2/1989 | Hamano et al. | 192/103 F X |
| 4,940,122 | 7/1990 | Fujieda | 192/3.31 |
| 4,989,702 | 1/1991 | Yoshimura et al. | 192/3.31 X |
| 5,010,990 | 4/1991 | Yoshimura et al. | 192/3.31 X |
| 5,058,716 | 10/1991 | Lippe et al. | 192/3.31 X |
| 5,060,769 | 10/1991 | Yoshimura et al. | 192/3.31 X |
| 5,090,527 | 2/1992 | Imamura et al. | 192/3.31 X |

FOREIGN PATENT DOCUMENTS

| | | | |
|---|---|---|---|
| 4030467 | 4/1991 | Fed. Rep. of Germany | 192/3.31 |
| 4-60268 | 2/1992 | Japan | 192/103 F |
| 4-64768 | 2/1992 | Japan | 192/3.31 |

Primary Examiner—Rodney H. Bonck
Assistant Examiner—Andrea Pitts
Attorney, Agent, or Firm—Foley & Lardner

[57] ABSTRACT

A control system for a lock-up clutch employed in a lock-up torque converter for an automotive automatic transmission includes a lock-up control valve for controlling a lock-up of the lock-up clutch, a duty-ratio controlled lock-up solenoid, and a control unit for quickly releasing the lock-up clutch at a higher speed based on a controlled duty ratio, when the change-speed operation is performed simultaneously with the lock-up clutch releasing operation.

6 Claims, 3 Drawing Sheets

CONTROL SYSTEM FOR LOCK-UP TORQUE CONVERTER FOR AUTOMATIC TRANSMISSIONS

BACKGROUND OF THE INVENTION

1. Field of the Invention

The present invention relates to a control system for a lock-up torque converter which includes a lock-up mechanism for automatic transmissions, and specifically to a system for controlling engagement and release of a lock-up clutch employed in the automotive lock-up torque converter.

2. Description of the Prior Disclosure

As is generally known, the conventional torque converter for automatic transmissions comprises a converter cover, a pump impeller integrally connected to the converter cover, a turbine runner firmly connected through a turbine hub to a transmission input shaft, and a stator provided between the pump impeller and the turbine runner to form a torque converter.

Recently, there have been proposed and developed various lock-up torque converters employing a lock-up clutch which is operable for directly and mechanically interconnecting the converter cover and the turbine runner to transmit torque from the engine crankshaft directly to the turbine runner during vehicle operation at speeds greater than a predetermined vehicle speed at which positive and negative fluctuations in torque transmitted from the crankshaft are minimal. One such lock-up torque converter has been disclosed in Japanese First Publication Tokkai (Showa) No. 63-172058. The conventional lock-up torque converter includes a control system for controlling engagement and release of the lock-up clutch. In the Japanese document No. 63-172058, the engaging force of the lock-up clutch is variably controlled by means of a duty-ratio controlled electromagnetic solenoid, such that the engaging force of the clutch is gradually decreased in accordance with a change in duty ratio of the solenoid.

The above-noted lock-up clutch is gradually released in accordance with the change in duty ratio imposed on the solenoid, even when the select lever is simultaneously shifted to an intended range position during releasing operation of the lock-up clutch. That is, the lock-up clutch is gradually released in response to the rate of change in duty ratio of the solenoid during the releasing operation, irrespective of the occurrence of shifting of the select lever. In the case where the lock-up clutch is merely released without shifting operation of the shift lever, it is preferable to gradually release the lock-up clutch depending on a change in duty ratio of the solenoid. However, in the case where the lock-up clutch is released simultaneously with shifting-up or shifting-down of the shift lever, there are some drawbacks, as follows.

Assuming that a change-speed instruction is generated just after generation of a releasing instruction for releasing the lock-up clutch, the change-speed operation may be performed before the lock-up clutch is completely released. As a result, the change-speed operation and the lock-up clutch releasing operation are partially overlapped. Therefore, so-called "select-shock" may take place. If the releasing operation of the lock-up clutch is always achieved rapidly, it may prevent the select shock. However, such a rapid release of the lock-up clutch itself results in a relatively large shock, even in the absence of the change-speed operation.

SUMMARY OF THE INVENTION

It is, therefore, in view of the above disadvantages, an object of the present invention to provide a control system for a lock-up clutch employed in a lock-up torque converter for automatic transmissions, which can optimally control a decreasing speed of engaging force of the lock-up clutch, depending on the existence of change-speed operation.

It is another object of the invention to provide a control system for a lock-up clutch employed in an automotive lock-up torque converter, which can optimally reduce so-called "select-shock" or other undesirable shocks, such as shock occurring during releasing operation of the lock-up clutch.

In order to accomplish the aforementioned and other objects, a control system for a lock-up clutch employed in a lock-up torque converter for an automatic transmission for an automotive vehicle, comprises a lock-up clutch releasing means for gradually releasing the lock-up clutch in a manner so as to gradually reduce an engaging force of the lock-up clutch in a transient state in which the lock-up clutch is shifted from a lock-up clutch engaged state to a lock-up clutch released state, a change-speed determination means for judging whether a change-speed operation of the vehicle should be performed depending on the running condition of the vehicle, and for generating a change-speed instruction when the change-speed determination means determines that the change-speed should be performed, a lock-up judgment means for judging whether the lock-up clutch should be conditioned in the clutch engaged state or in the clutch released state, depending on the vehicle running condition, and a quick releasing means responsive to the change-speed instruction generated at the same time when the lock-up judgment means determines the release of the lock-up clutch, for reducing the engaging force of the lock-up clutch at a higher speed than during non-change-speed operation. It is preferable that the quick releasing means reduces the engaging force of the lock-up clutch at a higher speed than during up-shift, when the down-shift operation is performed simultaneously with the lock-up clutch releasing operation.

According to another aspect of the invention, a control system for a lock-up clutch employed in a lock-up torque converter for an automatic transmission for an automotive vehicle, comprises a lock-up control spool valve connected to first and second pressure chambers defined at both sides of a lock-up piston of the lock-up clutch, for engaging and releasing the lock-up clutch, the spool valve being operable between a first position wherein a fluid pressure in the first pressure chamber is kept at a higher level than that in the second pressure chamber and the lock-up clutch is biased in a lock-up clutch releasing direction, and a second position wherein the fluid pressure in the first pressure chamber is kept at a lower level than that in the first chamber and the lock-up clutch is biased in a lock-up clutch engaging direction, a lock-up solenoid connected to the spool valve, for controlling the position of the spool valve; the lock-up solenoid being operable at a controlled duty cycle, so as to provide a controlled duty ratio equivalent to a designated engaging and releasing speed for the lock-up clutch, a change-speed determination means for judging whether a change-speed operation of the vehicle should be performed depending on the running condition of the vehicle, and for generating a change-speed instruction when the change-speed determination means determines that the change-speed should be performed, a lock-up judgment means for judging whether the lock-up clutch should be conditioned in the clutch engaged state or in the clutch released state, depending on the vehicle running condition, and a quick releasing means responsive to the change-speed instruction generated at the same time when the lock-up judgment means determines the release of the lock-up clutch, for varying the duty ratio of the lock-up solenoid to reduce the engaging force of the lock-up clutch at a higher speed than during non-change-speed operation. The quick releasing means preferably reduces the engaging force of the lock-up clutch at a higher speed than during up-shift, when the down-shift operation is performed simultaneously with the lock-up clutch releasing operation. The lock-up solenoid is a duty-ratio controlled electromagnetic solenoid. The fluid pressure in the first pressure chamber is regulated in inverse proportion to the duty ratio of the lock-up solenoid. For example, the lock-up clutch is kept in a clutch released state in the case of the duty ratio being 0, while the lock-up clutch is kept in a clutch engaged state in the case of the duty ratio being 100%.

DESCRIPTION OF THE PREFERRED EMBODIMENTS

Figure 1:
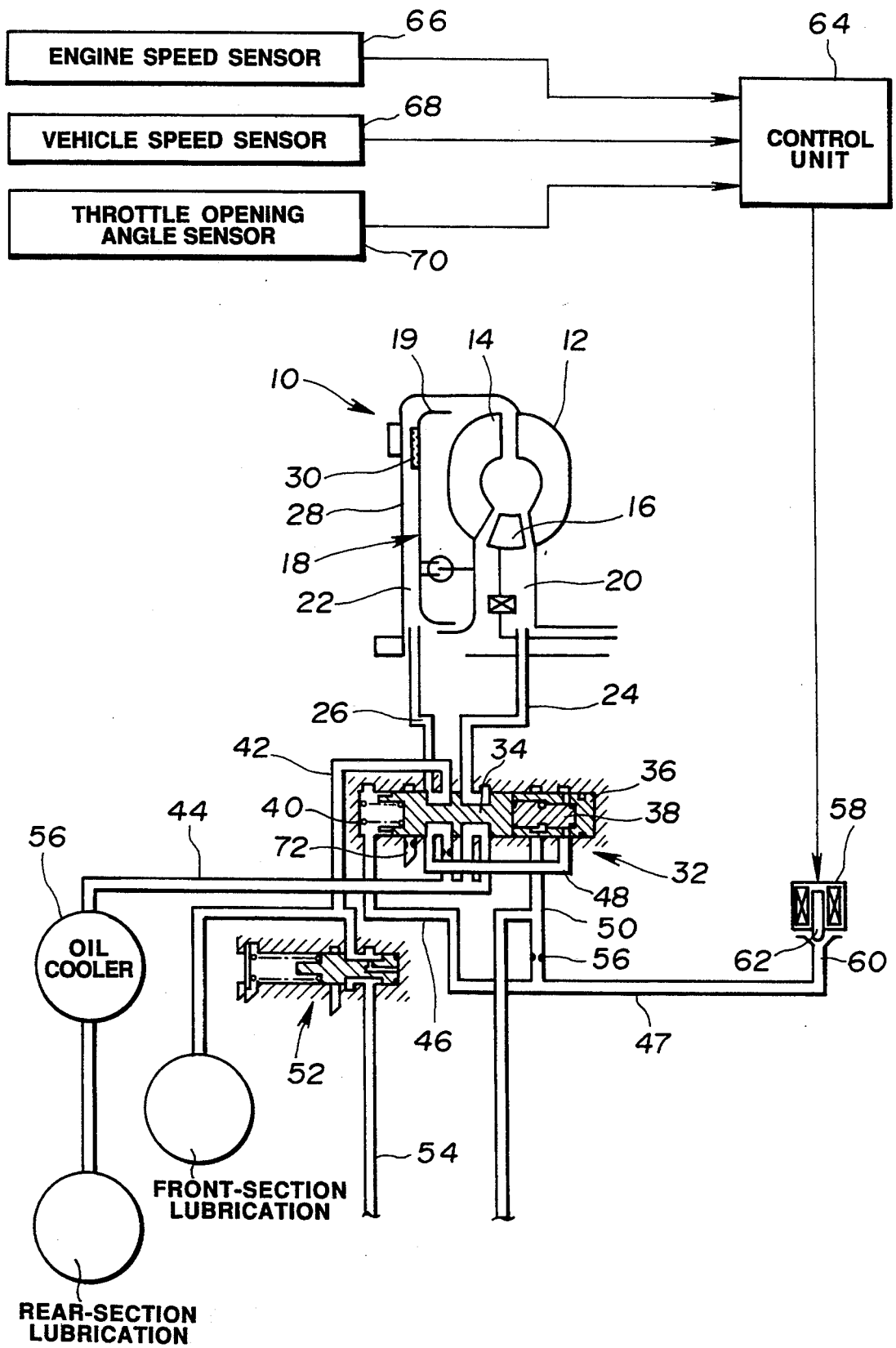
FIG. 1 is a schematic system diagram illustrating a preferred embodiment of a control system for a lock-up clutch for a lock-up torque converter for automatic transmissions.

Referring now to the drawings, particularly to FIG. 1, there is shown a control system for controlling an engaging force of a lock-up clutch employed in a lock-up torque converter 10 according to the invention. The torque converter 10 comprises a pump impeller 12 integrally connected to a converter cover 28, a turbine runner 14 firmly connected through a turbine hub to a transmission input shaft, and a stator provided between the pump impeller 12 and the turbine runner 14 to form a torque converter. The lock-up torque converter also includes a lock-up clutch 18 operably disposed between the converter cover 28 and the turbine runner 14. A pressure applying chamber 20, which will be hereinafter abbreviated as an "apply chamber", is defined in the right side of the lock-up clutch 18, while a pressure releasing chamber 22 which will be hereinafter abbreviated as a "release chamber" is defined in the left side of the lock-up clutch 18. The above-noted pump impeller 12 and turbine runner 14 are arranged in the apply chamber 20. As clearly seen in FIG. 1, the apply chamber 20 communicates with a fluid passage 24, while the release chamber 22 communicates with a fluid passage 26.

As is generally known, the lock-up clutch 18 is comprised of a lock-up piston 19 and a clutch facing 30 firmly attached to the lock-up piston 19. The clutch facing 30 is frictionally in contact with an inner peripheral surface of the converter cover 28, to provide a lock-up connection through which the converter cover 28 and the turbine runner 14 are directly interconnected with each other during vehicle operation at speeds above a predetermined vehicle speed at which torque fluctuations are minimal, so as to provide a high efficiency of torque transmission. Oil supplies to both of the fluid passages 24 and 26 are controlled by means of a lock-up control valve 32. The lock-up control valve 32 comprises a spool 34 axially slidable in the valve 32, a hollow stationary sleeve 36, and an axially slidable plug 38, and a return spring 40 provided for biasing the spool 34 in the axially right direction (viewing FIG. 1). In addition to the above, other fluid passages 42, 44, 46, 48 and 50 are arranged, as seen in FIG. 1. The fluid passage 42 is associated with a torque converter relief valve 52, such that a regulated constant working fluid pressure generated from the pressure relief valve 52 is applied to the fluid passage 42. A portion of the working fluid pressure regulated through the relief valve 52 is used to lubricate the front section of the torque converter. The relief valve 52 is communicated through another fluid passage 54 to a pressure regulating valve (not shown), so as to assure a pressure regulation in conjunction with the pressure regulating valve. On the other hand, the fluid passage 44 is connected to an oil cooler 56, such that cooled oil passing through the cooler 56 is used to lubricate the rear section of the torque converter. The fluid passage 50 is also connected to the previously noted pressure regulator so as to receive the regulator pressure. A fixed orifice 56 is arranged in the fluid passage 50. Just downstream of the orifice 56, the fluid passage 56 is branched into two branched fluid passages 46 and 47. An opening end 60 of the branched fluid passage 47 is associated with a plunger 62 of a lock-up solenoid 58, such that the opening end 60 is opened by means of the retracted plunger 62 in a solenoid de-energized state wherein the solenoid 58 is de-energized. In a solenoid energized state wherein the solenoid is energized, the lock-up solenoid 58 is loaded or energized at a predetermined duty cycle. In the solenoid energized state, ON/OFF states of the lock-up solenoid 58 are cyclically repeated at the predetermined duty cycle. In other words, the opening end 60 of the branched fluid passage 47 is opened depending on the time allocation of the ON state to the OFF state, with the result that a working fluid pressure in the branched fluid passages 46 and 47 is regulated in inverse proportion to the time allocation of the ON state of the solenoid 58 or the opening time of the opening end 60.

On the other hand, the fluid passage 48 corresponds to a pressure feed-back passage arranged for applying the fluid pressure in the release chamber 26 to the right end of the plug 38. In FIG. 1, reference numeral 72 designates a drain port.

As shown in FIG. 1, a control unit 64 according to the invention is also arranged for controlling the lock-up solenoid 58 with a predetermined duty ratio based on input signals generated from an engine speed sensor 66, a vehicle speed sensor 68, and a throttle valve opening angle sensor 70.

The operation of the lock-up clutch 18 will be hereinbelow described in detail.

The releasing state of the lock-up clutch 18 is achieved as follows.

First of all, the control unit 64 generates a command signal indicative of a duty ratio of 0 to the lock-up solenoid 58, with the result that the plunger 62 is held in an outwardly projected position. Under this condition, the opening end 60 is completely closed by means of the projected plunger 62. Therefore, the fluid pressure in the fluid passage 46 is maintained at the same level as the fluid pressure in the fluid passage 50. As a result, the same level of fluid pressure is applied to the left end of the spool 34 of the lock-up control valve 32 and therefore the spool is held in a rightmost position as shown in FIG. 1. In this case, the fluid pressure in the fluid passage 42 is fed through the fluid passage 26 to the release chamber 22 and thereafter the fluid pressure in the release chamber 22 is introduced through an aperture defined between the inner peripheral surface of the converter cover 28 and the clutch facing 30 into the apply chamber 20. Thereafter, the above-noted fluid pressure introduced into the apply chamber 20 is further returned through the fluid passage 24 to the lock-up control valve 32, and exhausted into the fluid passage 44. As set forth above, the fluid pressure in the release chamber 22 and the fluid pressure in the apply chamber 20 are held substantially the same. More exactly, the fluid pressure in the apply chamber 20 is held at a slightly lower pressure level than the fluid pressure in the release chamber 22, by a pressure loss created due to a fluid resistance at an interval between the two chambers 22 and 20. Under these conditions, the lock-up clutch 18 is held in a lock-up released state. In other words, the torque converter 10 is in a torque converting condition in which torque can be transmitted through only the working fluid.

In a transient state in which the state of the lock-up clutch 18 is transitioned from the lock-up clutch release state to a lock-up clutch engagement state, the control unit 64 operates as follows.

The control unit 64 gradually increases a duty ratio of the lock-up solenoid 58 in the transient state to the lock-up clutch engagement state. The greater the duty ratio becomes, the greater the amount of working fluid exhausted through the opening end 60 becomes, whereby the fluid pressure in the fluid passage 46 is gradually lowered in accordance with the increase in the duty ratio of the solenoid 58. As a result, the fluid pressure acting at the left end or the spool 34 of the lock-up control valve 32 is also lowered in accordance with the increase in the duty ratio. Therefore, both the spool 34 and the plug 38 move leftwards (viewing FIG. 1). In this manner, when the spool 34 and the plug 36 move in the left direction by a predetermined axial displacement, the fluid passage 26 is slightly communicated with the drain port 72, and in addition the fluid passage 42 is communicated with the fluid passage 24. As previously described, since the fluid pressure in the fluid passage 26 is fed back to the rightmost end of the plug 38 through the fluid passage 48, the lock-up control valve 32 is conditioned in a pressure regulating state, wherein the fluid pressure in the fluid passage 26 can be regulated as a consequence of its dependence on the fluid pressure acting at the leftmost end of the spool 34 via the fluid passage 46. In the above pressure regulating state of the lock-up control valve 32, oil pressure is applied through the fluid passage 24 to the apply chamber 20, and thereafter the fluid pressure in the apply chamber 20 is introduced into the release chamber 22 through an aperture defined between the lock-up piston 19 and the converter cover 28 and exhausted through the fluid passage 26 and the drain port 72. In this manner, the fluid pressure in the fluid passage 26 is adjusted depending on the controlled fluid pressure in the fluid passage 46, which controlled pressure is regulated in inverse proportion to the duty ratio of the solenoid 58. In the previously noted transient state in which there is a transistion from the lock-up clutch release state to the lock-up clutch engagement state, since the oil pressure is introduced from the apply chamber 20 to the release chamber 22, the fluid pressure in the release chamber 22 communicating the drain port 72 becomes lower than that in the apply chamber 20. As a result, the facing 30 of the lock-up clutch 18 is pressed on the inner peripheral surface of the converter cover 28. The pressure applied to the inner peripheral surface of the cover 28 by the facing 30 is varied depending on the degree of pressure reduction of the fluid pressure in the fluid passage 46. In other words, the applied pressure to the inner peripheral surface of the cover 28 is varied depending upon the duty ratio of the solenoid 58. As set forth above, since the lock-up clutch is gradually engaged depending on a variation in the duty-ratio of the solenoid 58 in the transient lock-up engaging state, the frictional force created at the frictional surface defined between the inner peripheral surface of the cover 28 and the clutch facing 30 is gradually increased with a proper slip occurring at the frictional surface. Therefore, the transient lock-up clutch engaging state can be referred to as a "slip controlling state" for the lock-up clutch 18.

After the slip control in the lock-up clutch engaging state is finished and the lock-up clutch is completely engaged, the duty ratio of the lock-up solenoid 58 is set at 100%, with the result that the opening end 60 of the fluid passage 47 is held open. As a result, the fluid pressure in the fluid passages 46 and 47 becomes 0 and therefore the spool 34 is positioned in the leftmost position. Under this positioned in the leftmost position. condition, the application of oil pressure introduced from the fluid passage 24 to the apply chamber 20 is maintained, thereby resulting in a complete engagement of the lock-up clutch 18. In addition, more of the oil supply to the fluid passage 26 is blocked.

In contrast to the above, when the state of the lock-up clutch 18 is shifted from the lock-up clutch engagement state to the lock-up clutch release state, the control unit 64 controls the duty ratio of the solenoid 58 as follows.

Figure 2:
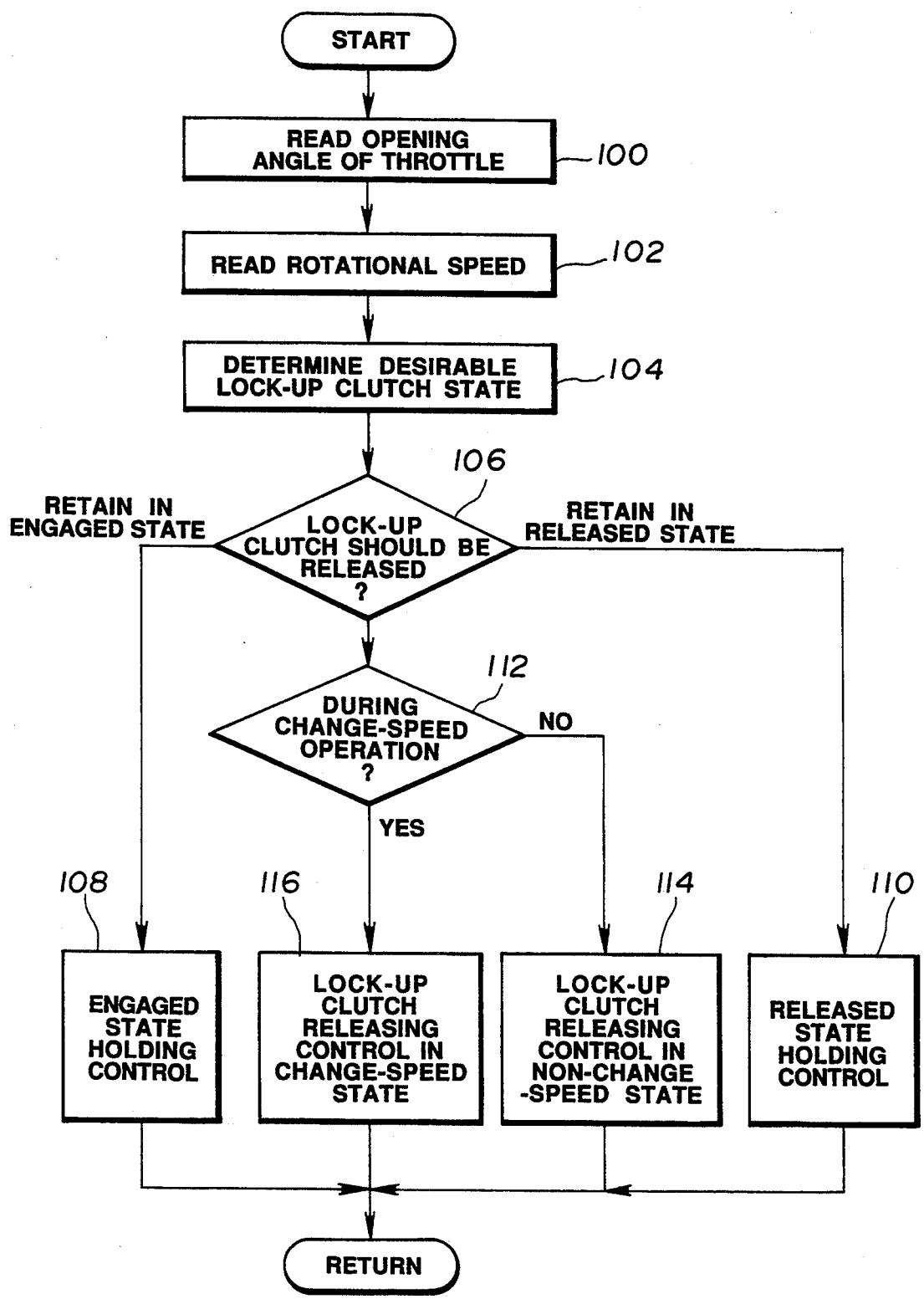
FIG. 2 is a flow chart illustrating a control procedure executed by the control unit of FIG. 1, so as to release the lock-up clutch.

The control unit 64 gradually decreases the duty ratio of the lock-up solenoid 58 in the transient state to the lock-up clutch release state. In more detail, the lock-up clutch releasing procedure executed by the control unit 64 is hereinbelow described accordance with the flow chart of FIG. 2.

In step 100, an opening angle of the throttle valve is read out on the basis of the throttle opening angle indicative signal generated from the throttle opening angle sensor 70.

In step 102, a rotational speed of the propeller shaft is derived on the basis of the vehicle speed indicative signal generated from the vehicle speed sensor 68.

In step 104, the control unit 64 judges whether the lock-up clutch 18 should be conditioned in the lock-up clutch engaged state or the lock-up clutch released state, depending on the current vehicle running state.

In step 106, the control unit 64 determines the current state of the lock-up clutch 18. Thereafter a test is made to determine whether the lock-up clutch 18 should be newly shifted to the clutch release state.

When the answer to step 106 is negative (NO), the lock-up clutch has already released or the lock-up clutch has already engaged. In case of the lock-up clutch released state, step 110 proceeds in which the lock-up clutch 18 is held in the released state. In case of the lock-up clutch engaged state, step 108 proceeds in which the lock-up clutch is held in the engaged state. When the answer to step 106 is affirmative (YES), step 112 proceeds.

In step 112, a test is made to determine whether the automatic transmission is conditioned in the change-speed operational mode. When the answer to step 112 is negative (NO), i.e., when the automatic transmission is out of the change-speed operation, the control procedure advances to step 114.

In step 114, the control unit 64 performs a lock-up clutch releasing control in a non-change-speed state.

When the answer to step 112 is affirmative, i.e., when the automatic transmission is in the change-speed operation, step 116 proceeds in which the control unit 64 performs a lock-up clutch releasing control in a change-speed state. The lock-up clutch releasing control of the step 116 executed during the change-speed operation is different from that of the step 114 executed in the non-change-speed state. The difference of clutch releasing controls of the two steps 114 and 116 will be appreciated from the graph of FIG. 3.

Figure 3:
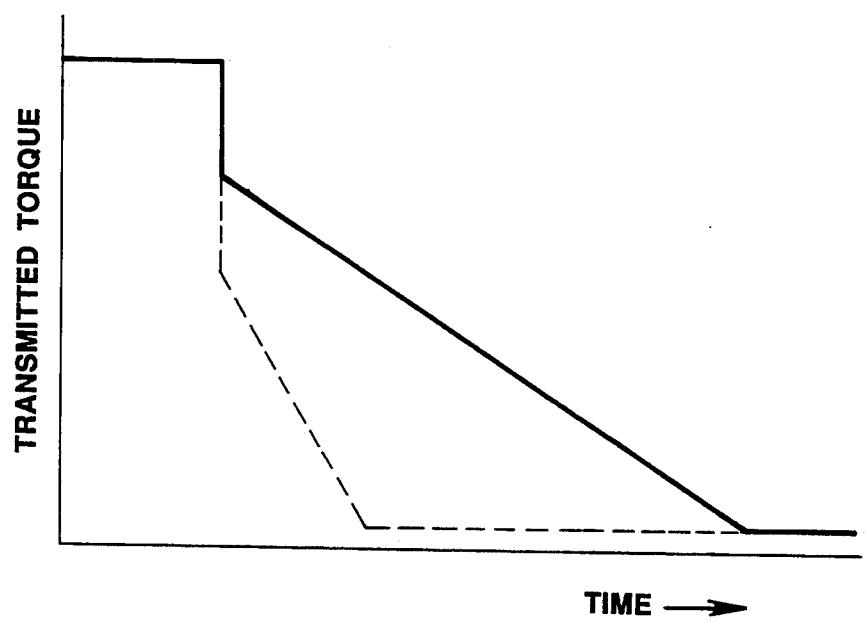
FIG. 3 is a graph illustrating a characteristic curve representative of a variation in the magnitude of torque transmitted through the lock-up clutch, during releasing operation thereof.

Referring now to FIG. 3, the solid line indicates a variation in torque transmitted through the lock-up clutch 18, based on the lock-up clutch releasing control in the non-change-speed state, while the broken line indicates a variation in the transmitted torque, based on the lock-up clutch releasing control in the change-speed state. As appreciated from the two torque characteristics, the transmitted torque is moderately decreased in the non-change-speed state, while the torque is quickly decreased in the change-speed state. That is to say, in the case that the change-speed operation is not performed simultaneously with the lock-up clutch releasing operation, the engaging force of the clutch 18 is moderately decreased in a conventional manner. Such a moderate release of the lock-up clutch 18 reduces a shock created due to the release of the clutch 18 itself to a minimum.

In contrast to the above, in the case that the change-speed operation is performed simultaneously with the lock-up clutch releasing operation, the engaging force of the clutch 18 is quickly decreased, as shown in the broken line of FIG. 3. In other words, the lock-up clutch 18 is quickly released when the change-speed operation is executed at substantially the same time as the lock-up clutch releasing operation. In this case, the lock-up clutch is completely released before the positive and negative torque fluctuations take place due to the change-speed operation. This prevents a relatively large select-shock from occurring during the change-speed operation.

The lock-up clutch releasing characteristics shown in FIG. 3 may be varied in dependence on the change-speed conditions, such as down-shift and up-shift. It is preferable that the lock-up clutch is more quickly released during down-shift when compared with up-shift, so as to assuringly reduce the select-shock. Furthermore, the characteristics of FIG. 3 may be suitably varied depending on the vehicle speed, the engine load, or the like.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. A control system in combination with a lock-up clutch employed in an automatic transmission of an automotive vehicle having a lock-up clutch releasing means for gradually releasing said lock-up clutch so as to reduce an engaging force of said lock-up clutch, a transient state in which said lock-up clutch is shifted from a lock-up clutch engaged state to a lock-up clutch released said control system comprising:

a change-speed determination means for judging whether a change-speed operation of the vehicle should be performed depending on a running condition of the vehicle and for generating a change-speed instruction when said change-speed determination means determines that the change speed should be performed;

a lock-up judgment means for judging whether said lock-up clutch should be conditioned in either one of an engaged state and a disengaged state, depending on the vehicle running condition; and a quick releasing means, responsive to said change-speed instruction generated at a same time as when said lock-up judgment means determines that said lock-up clutch should be conditioned in a disengaged state, for reducing the engaging force of said lock-up clutch at a higher lock-up clutch releasing speed than during non-change-speed operation.

2. The control means as set forth in claim 1, wherein said quick releasing means reduces the engaging force of said lock-up clutch at a higher lock-up clutch releasing speed than during up-shift, when a down-shift operation is performed simultaneously with the lock-up clutch releasing operation.

3. A control system in combination with a lock-up clutch employed in an automatic transmission of an automotive vehicle, comprising:

a lock-up control spool valve connected to first and second pressure chambers defined at both sides of a lock-up piston of said lock-up clutch, for engaging and releasing said lock-up clutch; said spool valve being operable between a first position wherein a fluid pressure in said first pressure chamber is kept at a higher level than that in said second pressure chamber and said lock-up clutch is biased in a lock-up clutch releasing direction, and a second position wherein the fluid pressure in said first pressure chamber is kept at a lower level than that in said second pressure chamber and said lock-up clutch is biased in a lock-up clutch engaging direction;

a lock-up solenoid connected to said spool valve, for controlling the position of said spool valve; said lock-up solenoid being operable at a controlled duty cycle, so as to provide a controlled duty ratio equivalent to a designated engaging and releasing speed for said lock-up clutch;

a change speed determination means for judging whether a change-speed operation of the vehicle should be performed depending on a running condition of the vehicle and for generating a change-speed instruction when said change-speed determination means determines that the change speed should be performed;

a lock-up judgment means for judging whether said lock-up clutch should be conditioned in either one of an engaged state and a disengaged state, depending on the vehicle running condition; and a quick releasing means, responsive to said change-speed instruction generated at a same time as when said lock-up judgment means determines that said lock-up clutch should be conditioned in a disengaged state, for varying the duty ratio of said lock-up solenoid to reduce an engaging force of said lock-up clutch at a higher lock-up clutch releasing speed than during non-change-speed operation.

4. The control system as set forth in claim 3, wherein said quick releasing means reduces the engaging force of said lock-up clutch at a higher lock-up clutch releasing speed than during up-shift, when a down-shift operation is performed simultaneously with the lock-up clutch releasing operation.

5. The control system as set forth in claim 3, wherein said lock-up solenoid is a duty-ratio controlled electromagnetic solenoid, and the fluid pressure in said first pressure chamber is regulated in inverse proportion to the duty ratio of said lock-up solenoid.

6. The control system as set forth in claim 5, wherein said lock-up clutch is kept in a clutch released state when the duty ratio is equal to 0, while said lock-up clutch is kept in a clutch engaged state when the duty ratio is equal to 100%.

* * * * *